(12) United States Patent
Lee

(10) Patent No.: US 8,348,213 B2
(45) Date of Patent: Jan. 8, 2013

(54) ADJUSTING MECHANISM AND PROJECTOR HAVING THE SAME

(75) Inventor: Sea-Huang Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 379 days.

(21) Appl. No.: 12/850,645

(22) Filed: Aug. 5, 2010

(65) Prior Publication Data

US 2012/0032046 A1 Feb. 9, 2012

(51) Int. Cl.
*E04G 3/00* (2006.01)
(52) U.S. Cl. ............... 248/287.1; 248/295.11; 248/327; 348/E5.128; 348/151; 352/243
(58) Field of Classification Search ............... 248/285.1, 248/295, 11, 287.1, 286.1, 279.1, 371, 317, 248/323, 327; 348/E5.128, E5.138, E5.144, 348/E5.143, E5.145, 151; 352/243
See application file for complete search history.

(56) References Cited

U.S. PATENT DOCUMENTS

| 4,148,453 A * | 4/1979 | Brantly ..................... 248/660 |
| 4,516,751 A * | 5/1985 | Westbrook ................ 248/279.1 |
| 5,240,215 A * | 8/1993 | Moore ........................ 248/279.1 |
| 5,938,161 A * | 8/1999 | Takeuchi et al. .............. 248/343 |
| 6,485,144 B1 | 11/2002 | Liao |
| 7,497,412 B2 * | 3/2009 | Dittmer et al. ................ 248/514 |
| 7,891,624 B2 * | 2/2011 | Dittmer et al. ................ 248/323 |
| 2012/0168391 A1* | 7/2012 | Liu .................................. 211/26 |

FOREIGN PATENT DOCUMENTS

| TW | M272012 | 8/2005 |
| TW | M287403 | 2/2006 |

* cited by examiner

*Primary Examiner* — Anita M King
(74) *Attorney, Agent, or Firm* — Jianq Chyun IP Office

(57) ABSTRACT

An adjusting mechanism adapted to adjust a position of a projection unit relative to a fixing object is provided. The adjusting mechanism includes a base, a sliding plate, a first screw, and an elastic element. The base is adapted to be fixed to the fixing object. The sliding plate is slidably disposed on the base along a first axis and adapted to be fixed to the projection unit. The first screw is fixed to the sliding plate and screwed to the base, wherein the first screw drives the projection unit to move relatively to the base along the first axis when the first screw is rotated. The elastic element is compressed between the base and the sliding plate along the first axis.

16 Claims, 8 Drawing Sheets

ADJUSTING MECHANISM AND PROJECTOR HAVING THE SAME

BACKGROUND OF THE INVENTION

1. Field of the Invention

The invention relates to an electronic device and an adjusting mechanism thereof. More particularly, the invention relates to a projector and an adjusting mechanism thereof.

2. Description of Related Art

A projector is a display device capable of generating large-size images. An imaging principle of the projector is as follows. At first, a light valve converts a light beam generated by a light source module into an image beam. Then, the image beam is projected on a screen or a wall through a lens.

To ensure the projector to accurately project the image beam to the screen or the wall to form an image, mounting members used for mounting the projector to a ceiling or the wall generally have a portion-adjusting function. When a user adjusts a portion of a projector relative to a fixing object (such as an indoor wall or ceiling) in a vertical direction, it is hard to raise the projector because of a weight of the projector.

Taiwan Patent Nos. M287403 and M272012 and U.S. Pat. No. 6,485,144 disclose the related techniques.

SUMMARY OF THE INVENTION

The invention is directed to an adjusting mechanism, and a user is able to easily adjust a portion of a projection unit in a direction by the adjusting mechanism.

The invention is directed to a projector, and a user is able to easily adjust a portion of a projection unit in a direction by the adjusting mechanism of the projector.

To achieve at least one of aforementioned or other advantages, one embodiment of the invention provides an adjusting mechanism adapted to adjust a position of a projection unit relative to a fixing object. The adjusting mechanism includes a base, a sliding plate, a first screw, and an elastic element. The base is adapted to be fixed to the fixing object. The sliding plate is slidably disposed on the base along a first axis and adapted to be fixed to the projection unit. The first screw is fixed to the sliding plate and screwed to the base, wherein the first screw drives the projection unit to move relatively to the base along the first axis when the first screw is rotated. The elastic element is compressed between the base and the sliding plate along the first axis.

To achieve at least one of aforementioned or other advantages, one embodiment of the invention provides a projector including a projection unit and an adjusting mechanism. The adjusting mechanism includes a base, a sliding plate, a first screw, and an elastic element. The base is adapted to be fixed to a fixing object. The sliding plate is slidably disposed on the base along a first axis and fixed to the projection unit. The first screw is fixed to the sliding plate and screwed to the base, wherein the first screw drives the projection unit to move relatively to the base along the first axis when the first screw is rotated. The elastic element is compressed between the base and the sliding plate along the first axis.

According to the above descriptions, the above embodiments or the above embodiments of the invention may have at least one of the following advantages, an elastic element is compressed between the base and the sliding plate, and an elastic recovering force of the elastic element is generated, for example, a recovering force to resist gravity (a weight of the projection unit). Accordingly, while a user raises the projection unit by rotating the first screw, the user is easy to adjust the position of the projection unit in a direction, for example, a vertical direction, with the elastic recovering force. Thus, an adjustment difficulty of the projection unit is decreased, and adjusting time is saved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
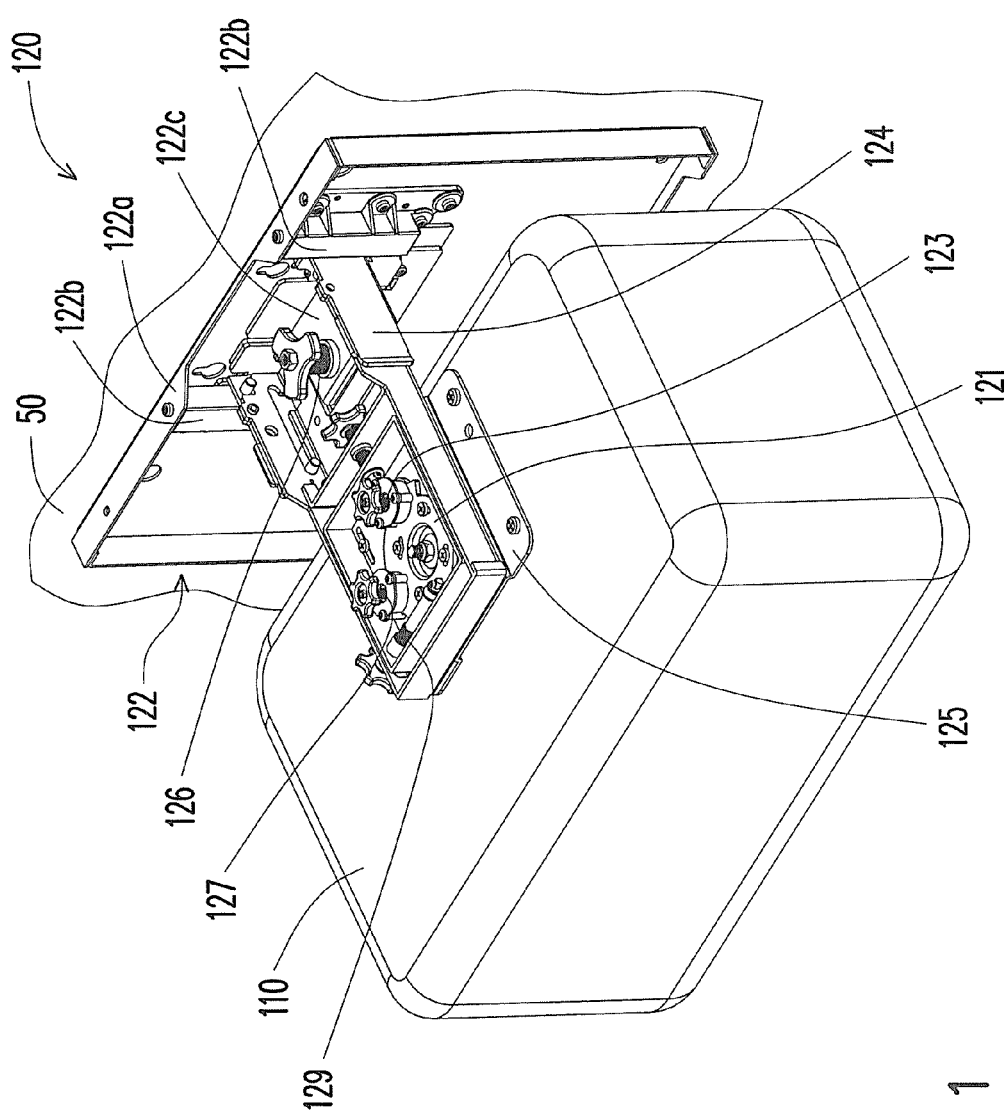
FIG. 1 is a three-dimensional view of a projector according to an embodiment of the invention.
Figure 2:
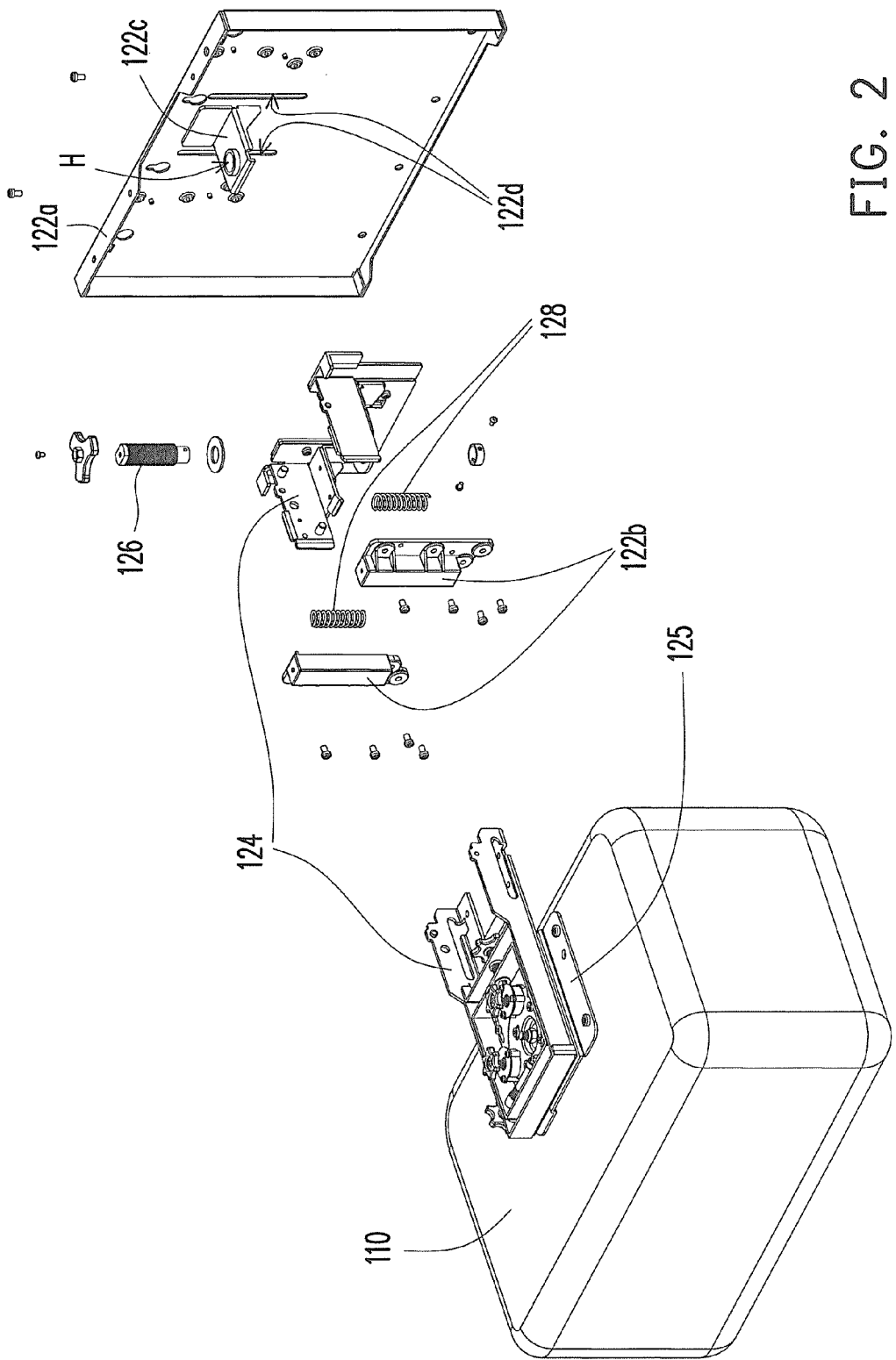
FIG. 2 is an exploded view of the projector of FIG. 1.

FIG. 1 is a three-dimensional view of a projector according to an embodiment of the invention. FIG. 2 is an exploded view of the projector of FIG. 1. Referring to FIG. 1 and FIG. 2, the projector 100 of the embodiment includes a projection unit 110 and an adjusting mechanism 120. The adjusting mechanism 120 includes a base 122, a sliding plate 124, a first screw 126, and elastic elements 128 (showing two). The base 122 is adapted to be fixed to a fixing object 50. The sliding plate 124 is slidably disposed on the base 122 along a first axis A1 and fixed to the projection unit 110. In the embodiment, the fixing object 50 is, for example, an indoor wall or a ceiling. In addition, the sliding plate 124 is slidably disposed on the base 122, for example, slots 122d of the base 122.

Figure 3:
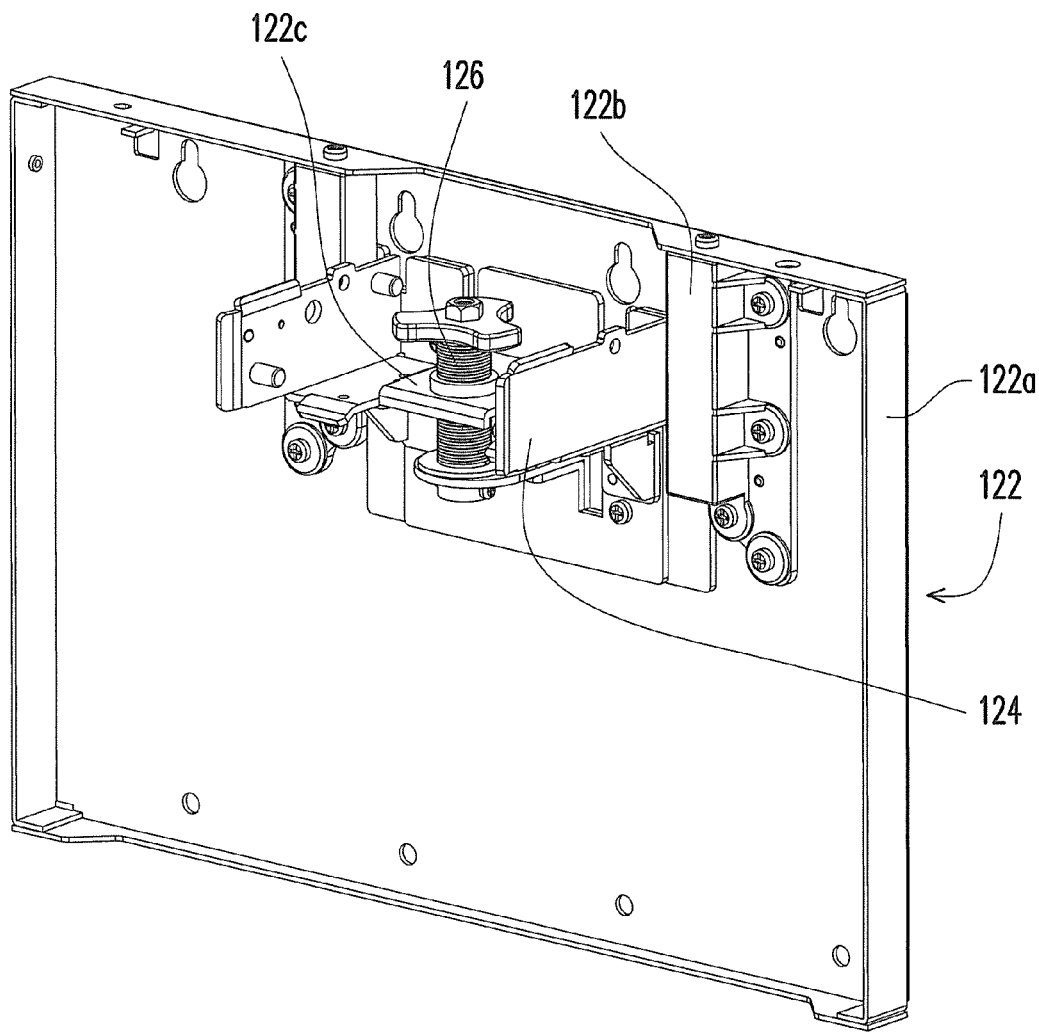
FIG. 3 is a partial view of the adjusting mechanism of FIG. 1.

FIG. 3 is a partial view of the adjusting mechanism of FIG. 1. Referring to FIG. 1 and FIG. 3, the first screw 126 is fixed to the sliding plate 124 and screwed to the base 122. A user could rotate the first screw 126 to move the projection unit 110 relatively to the base 122 and the fixing object 50 along the first axis A1.

Figure 4:
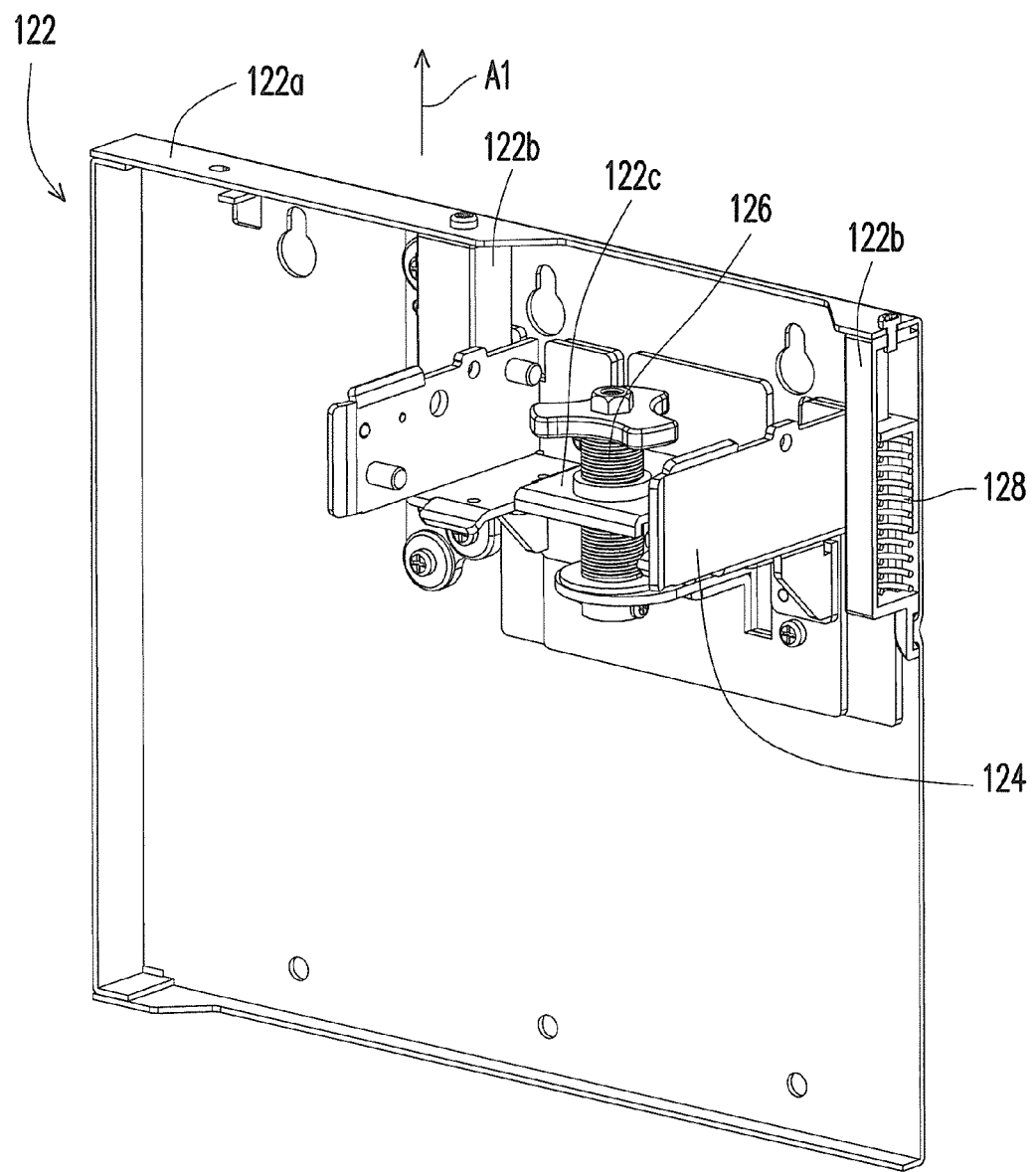
FIG. 4 is a partial view of the adjusting mechanism of FIG. 3.
Figure 5:
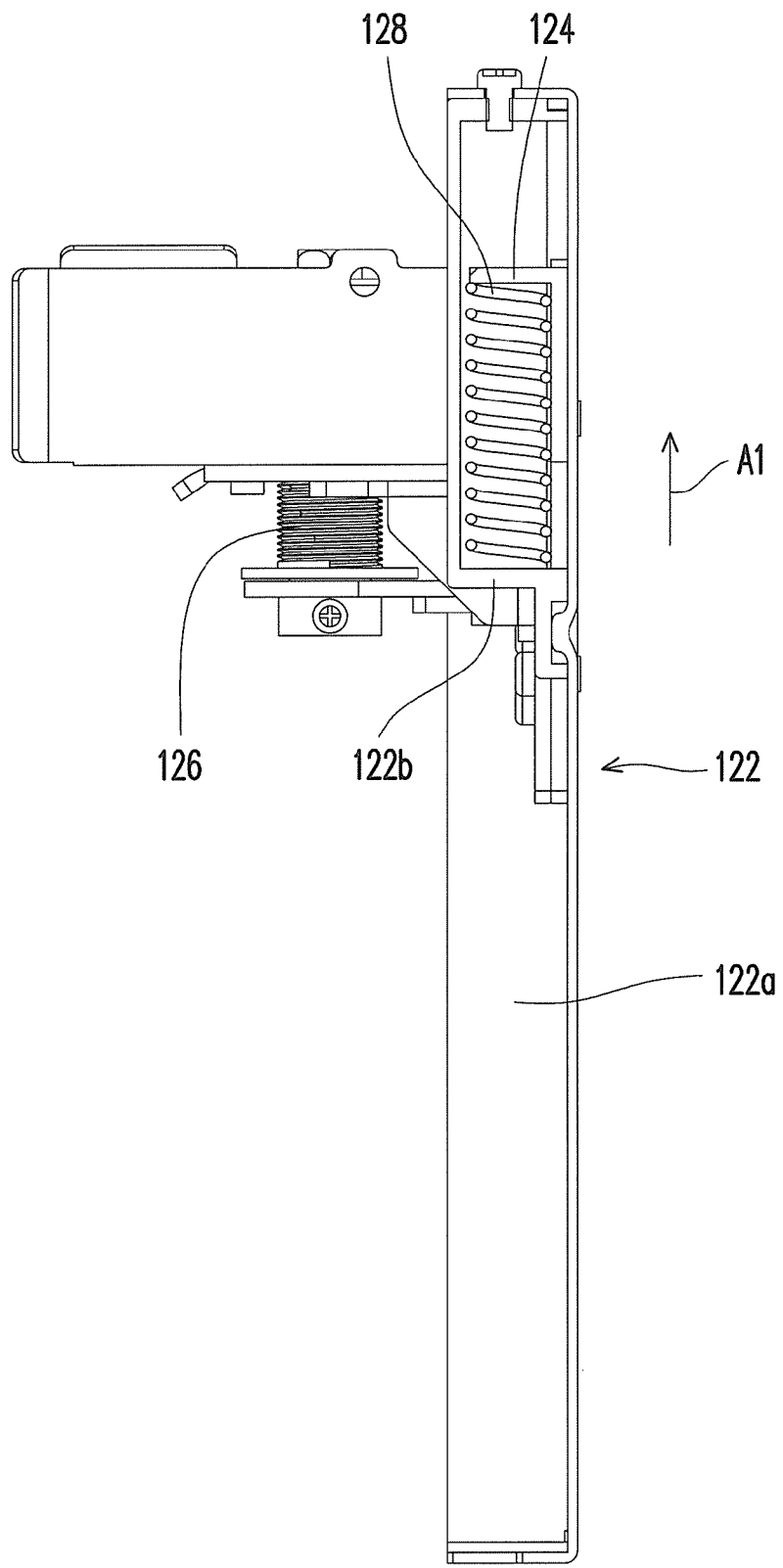
FIG. 5 is a side view of the adjusting mechanism of FIG. 4.

FIG. 4 is a partial view of the adjusting mechanism of FIG. 3. FIG. 5 is a side view of the adjusting mechanism of FIG. 4. Referring to FIG. 4 and FIG. 5, the elastic element 128 is compressed between the base 122 and the sliding plate 124 along the first axis A1. Thus, an elastic recovering force of the elastic element 128 resists a weight of the projection unit 110 (shown in FIG. 1). Accordingly, while a user raises the projection unit 110 by rotating the first screw 126, the user is easy to adjust the projection unit 110 in a vertical direction (first axis) A1. The elastic element 128 of the embodiment is, for example, a spring.

Referring to FIG. 1, particularly, the base 122 includes a fixing plate 122a, shells 122b (showing two), and a screw portion 122c. The fixing plate 122a is adapted to be fixed to the fixing object 50. Each of the shells 122b is fixed to the fixing plate 122a and covering the corresponding elastic element 128 as shown in FIG. 4 and FIG. 5, wherein the elastic element 128 is compressed between each of the shells 122b and the sliding plate 124. The screw portion 122c is fixed to the fixing plate 122a and having a screw hole H as shown in FIG. 2, wherein the first screw 126 is screwed through the screw hole H.

Figure 6:
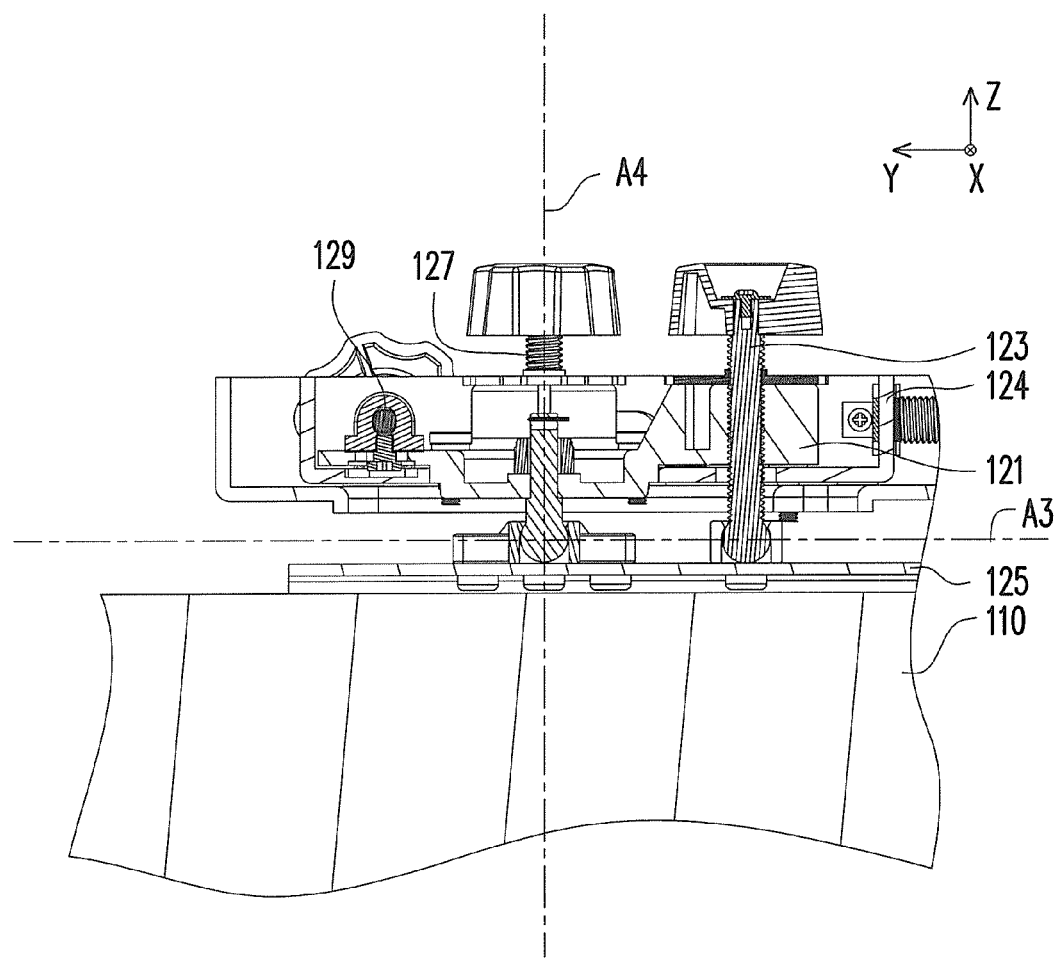
FIG. 6 and FIG. 7 are partial cross-sectional views of the projector of FIG. 1.
Figure 7:
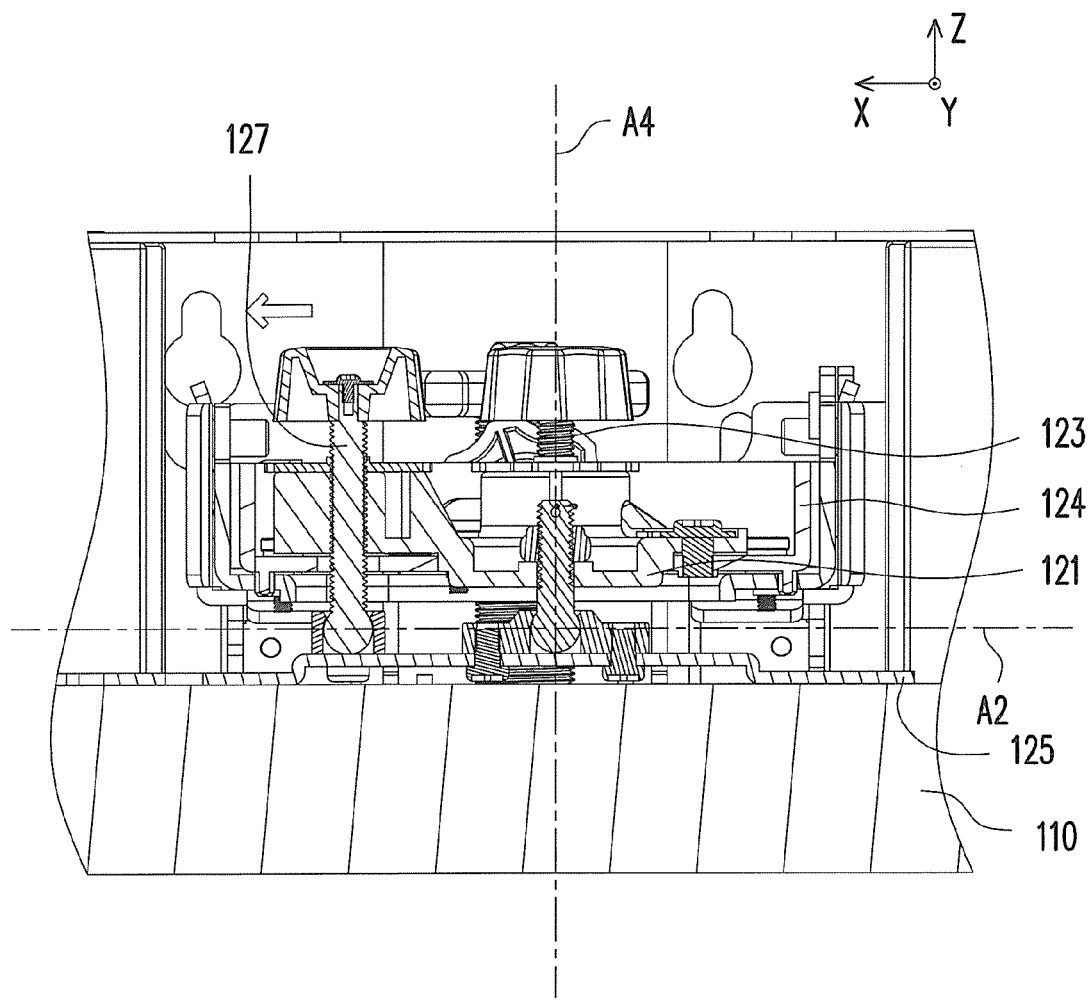
Figure 8:
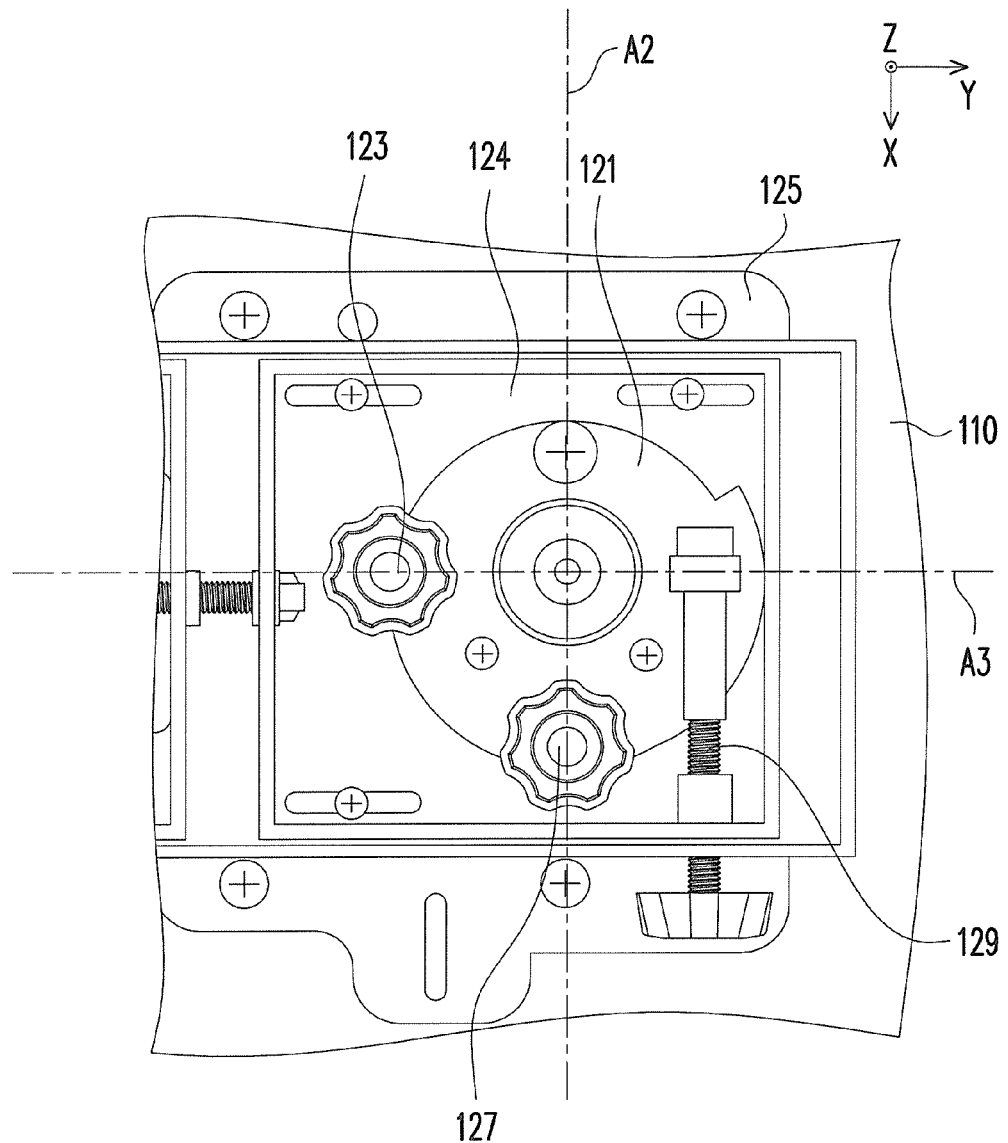
FIG. 8 is a partial top view of the projector of FIG. 1.

Referring to FIG. 1, the adjusting mechanism 120 further includes a rotary plate 121 and a second screw 123. The rotary plate 121 is pivotally connected to the sliding plate 124, and is ball-jointed to the projection unit 110. FIG. 6 and FIG. 7 are partial cross-sectional views of the projector of FIG. 1. FIG. 8 is a partial top view of the projector of FIG. 1. Referring to FIG. 6 to FIG. 8, the second screw 123 is screwed to the rotary plate 121, and is ball jointed to the projection unit 110. When the second screw 123 is rotated, the second screw 123 drives the projection unit 110 to rotate relatively to the rotary plate 121 along a second axis A2 (the second axis A2 is substantially paralleled to an X-direction). Additionally, the rotary plate 121 and the sliding plate 124 may not be rotated along the second axis A2. In such situation, when the projection unit 110 is rotated relatively to the rotary plate 121 around the second axis A2, the projection unit 110 is equivalent to be rotated relatively to the sliding plate 124 and the fixing object 50 (shown in FIG. 1) along the second axis A2.

In other words, when a user wants to rotate the projection unit 110 along the X-direction to adjust an angle of the projection unit 110, the user may rotate the second screw 123 along a Z-direction to drive the projection unit 110 to rotate relatively to the rotary plate 121 along the second axis A2. In the aforementioned adjusting process, the projection unit 110 is only rotated along the second axis A2, so that the projection unit 110 may be independently rotated along the X-direction to adjust the angle of the projection unit 110.

Referring to FIG. 1 and FIG. 6 to FIG. 8, the adjusting mechanism 120 further includes an interface sheet 125. The interface sheet 125 is fixed on the projection unit 110, wherein the second screw 123 is ball-jointed to the interface sheet 125, and the rotary plate 121 is ball jointed to the interface sheet 125. In other words, the second screw 123 and the rotary plate 121 are indirectly ball-jointed to the projection unit 110 through the ball joints with the interface sheet 125.

The adjusting mechanism 120 of the embodiment further includes a third screw 127. The third screw 127 is screwed to the rotary plate 121 and is ball-jointed to the projection unit 110. When the third screw 127 is rotated, the third screw 127 drives the projection unit 110 to rotate relatively to the rotary plate 121 along a third axis A3. The third axis A3 is substantially perpendicular to the second axis A2 and is substantially paralleled to a Y-direction. The rotary plate 121 and the sliding plate 124 may not be rotated along the third axis A3, so when the projection unit 110 is rotated relatively to the rotary plate 121 along the third axis A3, the projection unit 110 is equivalent to be rotated relatively to the sliding plate 124 and the fixing object 50 along the third axis A3.

In other words, when the user wants to rotate the projection unit 110 along the Y-direction to adjust the angle of the projection unit 110, the user may rotate the third screw 127 along the Z-direction to drive the projection unit 110 to rotate relatively to the rotary plate 121 along the third axis A3. In the aforementioned adjusting process, the projection unit 110 is only rotated along the third axis A3, so that the projection unit 110 may be independently rotated along the Y-direction to adjust the angle of the projection unit 110.

Referring to FIG. 1 and FIG. 6 to FIG. 8, the adjusting mechanism 120 of the embodiment further includes a fourth screw 129. The fourth screw 129 is screwed to the sliding plate 124 and is connected to the rotary plate 121. When the fourth screw 129 is rotated, the fourth screw 129 drives the rotary plate 121 to rotate relatively to the sliding plate 124 along a fourth axis A4. The fourth axis A4 is substantially perpendicular to the second axis A2 and the third axis A3 and is substantially paralleled to the Z-direction. The sliding plate 124 may not be rotated along the fourth axis A4, so when the rotary plate 121 is rotated relatively to the sliding plate 124 along the fourth axis A4, the projection unit 110 is simultaneously rotated relatively to the sliding plate 124 and the fixing object 50 along the fourth axis A4.

In other words, when the user wants to rotate the projection unit 110 along the Z-direction to adjust the angle of the projection unit 110, the user may rotate the fourth screw 129 around the X-direction to drive the rotary plate 121 to rotate relatively to the sliding plate 124 along the fourth axis A4. In the aforementioned adjusting process, the projection unit 110 is only rotated along the fourth axis A4, so that the projection unit 110 may be independently rotated along the Z-direction to adjust the angle of the projection unit 110.

In summary, the embodiment or the embodiments of the invention may have at least one of the following advantages, an elastic element is compressed between the base and the sliding plate, and an elastic recovering force of the elastic element is generated. While a user raises the projection unit along the first axis by rotating the first screw, such that the user is easy to adjust the projection unit in a direction with the elastic recovering force. Thus, an adjustment difficulty of the projection unit is decreased, and adjusting time is saved. In addition, the second screw, the third screw or the fourth screw may be rotated to drive the projection unit to rotate relatively to the rotary plate respectively along the second axis, the third axis or the fourth axis, so as to independently adjust the angle of the projection unit relative to the fixing object in each direction without causing an angle deviation of the projection unit in other directions, so that the adjustment difficulty of the projection unit is further decreased, and adjusting time is further saved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjusting mechanism, adapted to adjust a position of a projection unit relative to a fixing object, the adjusting mechanism comprising:
    a base adapted to be fixed to the fixing object;
    a sliding plate slidably disposed on the base along a first axis and adapted to be fixed to the projection unit;
    a first screw fixed to the sliding plate and screwed to the base, wherein the first screw drives the projection unit to move relatively to the base along the first axis when the first screw is rotated; and
    an elastic element compressed between the base and the sliding plate along the first axis.

2. The adjusting mechanism as claimed in claim 1, wherein the base comprising:
    a fixing plate adapted to be fixed to the fixing object; and
    a shell fixed to the fixing plate and covering the elastic element, wherein the elastic element is compressed between the shell and the sliding plate.

3. The adjusting mechanism as claimed in claim 2, wherein the base further comprising:
    a screw portion fixed to the fixing plate and having a screw hole, wherein the first screw is screwed through the screw hole.

4. The adjusting mechanism as claimed in claim 1, wherein the elastic element is a spring.

5. The adjusting mechanism as claimed in claim 1, further comprising:
    a rotary plate pivotally connected to the sliding plate and adapted to be ball jointed to the projection unit; and
    a second screw screwed to the rotary plate and adapted to be ball-jointed to the projection unit, wherein the second screw drives the projection unit to rotate relatively to the rotary plate along a second axis when the second screw is rotated.

6. The adjusting mechanism as claimed in claim 5, further comprising:
    a third screw screwed to the rotary plate and adapted to be ball-jointed to the projection unit, wherein the third screw drives the projection unit to rotate relatively to the rotary plate along a third axis when the third screw is rotated, and the third axis is substantially perpendicular to the second axis.

7. The adjusting mechanism as claimed in claim 6, further comprising:
    a fourth screw screwed to the sliding plate and connected to the rotary plate, wherein the fourth screw drives the rotary plate to rotate relatively to the sliding plate along a fourth axis when the fourth screw is rotated, and the fourth axis is substantially perpendicular to the second axis and the third axis.

8. The adjusting mechanism as claimed in claim 5, further comprising:
    an interface sheet adapted to be fixed on the projection unit, wherein the second screw is ball-jointed to the interface sheet, and the rotary plate is ball-jointed to the interface sheet.

9. A projector, comprising:
    a projection unit; and
    an adjusting mechanism, comprising:
        a base adapted to be fixed to a fixing object;
        a sliding plate slidably disposed on the base along an first axis and fixed to the projection unit;
        a first screw fixed to the sliding plate and screwed to the base, wherein the first screw drives the projection unit to move relatively to the base along the first axis when the first screw is rotated; and
        an elastic element compressed between the base and the sliding plate along the first axis.

10. The projector as claimed in claim 9, wherein the base comprising:
    a fixing plate adapted to be fixed to the fixing object; and
    a shell fixed to the fixing plate and covering the elastic element, wherein the elastic element is compressed between the shell and the sliding plate.

11. The projector as claimed in claim 10, wherein the base further comprising:
    a screw portion fixed to the fixing plate and having a screw hole, wherein the first screw is screwed through the screw hole.

12. The projector as claimed in claim 9, wherein the elastic element is a spring.

13. The projector as claimed in claim 9, wherein the adjusting mechanism further comprising:
    a rotary plate pivotally connected to the sliding plate and ball jointed to the projection unit; and
    a second screw screwed to the rotary plate and ball-jointed to the projection unit, wherein the second screw drives the projection unit to rotate relatively to the rotary plate along a second axis when the second screw is rotated.

14. The projector as claimed in claim 13, wherein the adjusting mechanism further comprising:

a third screw screwed to the rotary plate and ball-jointed to the projection unit, wherein the third screw drives the projection unit to rotate relatively to the rotary plate along a third axis when the third screw is rotated, and the third axis is substantially perpendicular to the second axis.

15. The projector as claimed in claim 14, wherein the adjusting mechanism further comprising:

a fourth screw screwed to the sliding plate and connected to the rotary plate, wherein the fourth screw drives the rotary plate to rotate relatively to the sliding plate along a fourth axis when the fourth screw is rotated, and the fourth axis is substantially perpendicular to the second axis and the third axis.

16. The projector as claimed in claim 13, wherein the adjusting mechanism further comprising:

an interface sheet fixed on the projection unit, wherein the second screw is ball jointed to the interface sheet, and the rotary plate is ball-jointed to the interface sheet.

* * * * *